April 5, 1932. W. B. GRIFFITH 1,852,999

FLOW DETECTOR

Filed March 12, 1930

Inventor:
William B. Griffith
By F. DeWitt Goodwin
Attorney

Patented Apr. 5, 1932

1,852,999

UNITED STATES PATENT OFFICE

WILLIAM B. GRIFFITH, OF AUDUBON, NEW JERSEY, ASSIGNOR TO STAR SPRINKLER CORPORATION, OF PHILADELPHIA, PENNSYLVANIA, A CORPORATION OF NEW JERSEY

FLOW DETECTOR

Application filed March 12, 1930. Serial No. 435,209.

My invention relates to a flow detector adapted for use in systems requiring piping and valves for shutting off the flow of water or liquid through the pipes. My invention provides a means by which the flow of water from a leaky valve may be detected without disconnecting the piping. My device is particularly adapted for use in connection with sprinkler systems for fire protection of buildings employing shut off valves in the pipes between the system and the drains and also valves located at various points throughout the system for testing the system, which latter valves are also connected with pipes leading to the drains. The underwriters' requirements are that some form of leak or flow detector be employed by which a leaky valve may be detected, thus preventing the possibility of a continuous flow of water through a defective valve, which would empty the system or impair its efficient operation.

Heretofore the practice has been to employ a device having a glass tube, or a glass window, secured in a casing, through which the flow of water from a defective valve may be determined by observation. The objection to this form of device is that the glass tubes or windows become stained, making it impossible to determine whether or not there is any water flowing through the device.

The object of my invention is to provide a casing having pipe connections thereon, which may be installed as a permanent part of a sprinkler system; a further object is to provide a casing preferably of cast metal, without any parts which are breakable so that the device may be installed without injury, due to the use of wrenches during installation; a further object of my invention is to provide a casing having an enlarged portion forming a pocket for the accumulation of water which may flow through the pipes from a defective valve; and a still further object is to provide the casing with an aperture for the attachment of a shut off valve through which the water may be drawn from the pocket of the casing, and through which the water will continue to flow from a defective valve. These together with various novel features of construction and arrangement of the parts, which will be more fully hereinafter described and claimed, constitute my invention.

Figure 1:
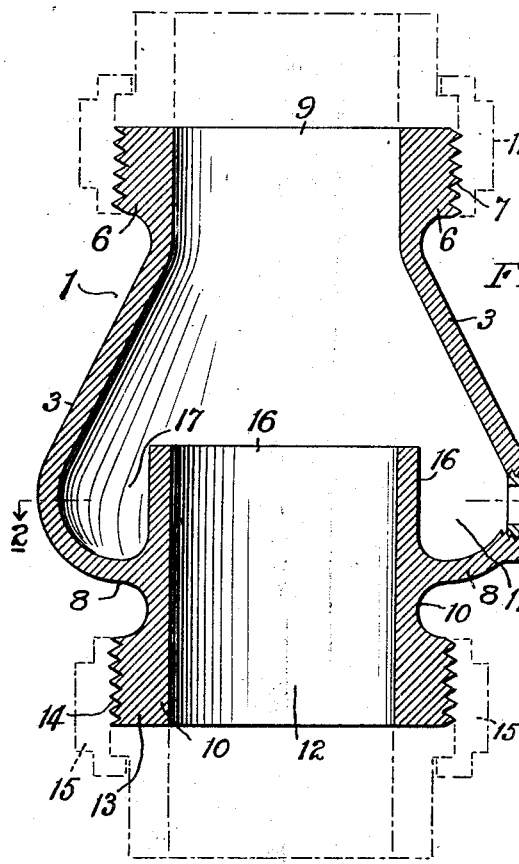
Figure 2:
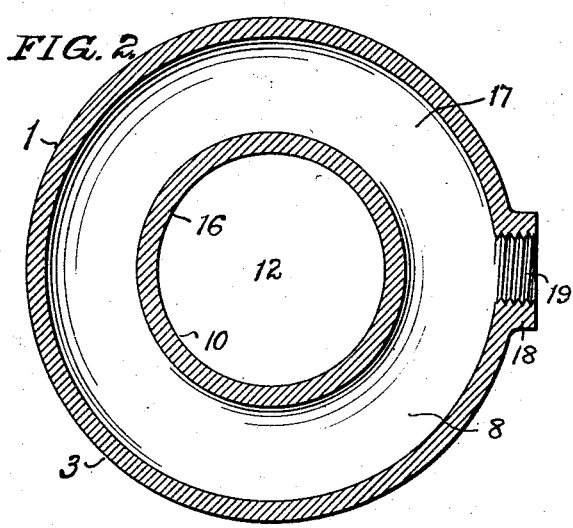
Figure 3:
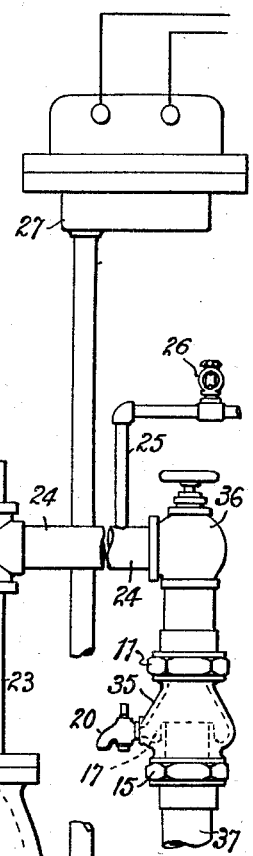
Figure 3:
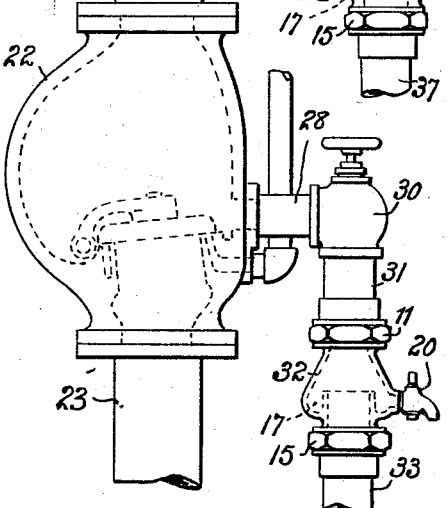

Referring to the accompanying drawings, Fig. 1 is a vertical central sectional view of my improved flow detector; Fig. 2 is a transverse section on line 2—2, Fig. 1; and Fig. 3 is a diagrammatic view illustrating a portion of a sprinkler system embodying my improved flow detectors.

In the accompanying drawings in which like reference characters refer to like parts, 1 represents my improved flow detector comprising a casing which is preferably made of cast metal, having an outer wall 3 of conical formation terminating at its apex with a collar 6 forming a pipe connection. The collar 6 is shown as having a screw thread 7 formed upon its outer surface for the attachment of a pipe union 11. An inlet opening 9 is thus formed through the collar 6.

The enlarged portion of the conical wall 3 of the casing is joined with an inwardly curved bottom wall 8 which is integrally formed upon the outer cylindrical surface of an outlet pipe 10 which forms an outlet opening 12. A collar 13 is formed upon the outer end of the pipe 10 and is provided with a screw thread 14 for the attachment of a union 15. Any other form of pipe connection may be used.

A flange 16 is formed by the inner end of the pipe 10 and projects into the interior of the casing and terminates in spaced relation with the inlet opening 9.

The outer wall 3 of the casing together with the bottom wall 8 and the flange 16 form a pocket 17, which is open toward the inlet opening 9. Said pocket 17 is of annular formation and is adapted to receive the flow of water from a defective shut off valve in the system when the water slowly drips down the pipe connected with the inlet opening 9. The conical outer wall 3 of the casing is gradually inclined outwardly from the inlet opening 9 to the enlarged portion of the casing forming the pocket 17 so that the water will adhere to the inner surface of the inclined wall of the casing and enter the pocket 17 instead of dripping into the outlet opening 12 surrounded by the upstanding flange 16.

The casing 1 is provided with an enlarged boss 18 having a threaded aperture 19 formed therein for the attachment of a draw off valve 20. Said aperture 19 is located adjacent to the bottom wall 8 of the pocket 17 formed in the casing so that water which has accumulated in the pocket may be drawn off through the valve 20.

Fig. 3 illustrates a sprinkler system embodying an alarm valve 22 connected in the riser 23 of the system, which pipe 23 supplies water through pipes 24 and 25 to the sprinkler heads 26 arranged at various places throughout the system. An alarm device 27 is connected with the alarm valve 22, which device operates when the valve 22 is open and water is flowing through the system.

The alarm valve 22 is connected by a pipe 28 with a shut off valve 30 adapted for draining the system. A pipe 31 connects the shut off valve 30 with my improved flow detector 32, which in turn is connected with a drain pipe 33. When the shut off valve 30 is open for draining, or testing the system, the water will flow through the flow detector 32 into the drain pipe 33. When the shut off valve 30 is closed, and a leak occurs in the valve the water will flow down the pipe 31 and along the inner surface of the conical wall of the flow detector and accumulate in the pocket 17 of the latter, from which it may be drawn off through the draw off valve 20. Upon making an inspection of the system, when water is found to have accumulated in the pocket 17 of the flow dectector, a continuous flow through the draw off valve will indicate that the shut off valve is leaking.

Fig. 3 also shows a flow detector 35 connected with the shut off valve 36 connected with the pipe 24 of the system. The flow detector 35 is connected with a drain pipe 37, and operates in the manner above described.

The flow detectors may be located at various points throughout the system and may be used in either a vertical or horizontal position, thus providing a convenient and satisfactory method of detecting the presence of leaks in the system.

My improved flow detector is substantially constructed so that it may be installed without the possibility of injury, will not become defective through continuous operation, and may be manufactured at a very low cost. My improved device also provides means for readily inspecting the shut off valves to ascertain if there are any leaks which would cause a continuous flow of water. My device is simple in operation as it provides a means for inspecting the condition of the valves by simply opening a draw off valve. Upon the opening of which draw off valve, if water is found to have accumulated in the flow detector, it will indicate that the shut off valve is defective.

Various changes may be made in the construction and the arrangement of the parts without departing from my invention.

I claim:—

A flow detector comprising a hollow conical body portion of truncated formation, a cylindrical inlet connection located above the body portion, a connecting portion between the lower end of the inlet connection and the body portion having a gradually outwardly curved inner surface extending from the inner cylindrical surface of the inlet connection to the inner conical surface of the body portion whereby water dripping down the surface of the inlet connection will follow the outwardly diverging surface of the conical body portion, an outlet connection arranged in vertical axial alignment with the inlet connection, an inwardly curved bowl shaped portion connected with the lower end of the conical body portion forming an annular receptacle surrounding the outlet connection, said bowl shaped portion having a drain aperture formed therein below the top of the outlet connection, and a valve arranged for opening and closing the drain aperture.

In testimony whereof I affix my signature.

WILLIAM B. GRIFFITH.